United States Patent
Schäfer et al.

(10) Patent No.: US 6,690,285 B2
(45) Date of Patent: Feb. 10, 2004

(54) AGRICULTURAL IMPLEMENT COMPONENT ROTATION ALARM

(75) Inventors: Rainer Richard Schäfer, Zweibrücken (DE); Eberhard Holtkotte, Zweibrücken (DE); Karl-Josef Willeke, Dellfeld (DE); Larry N. Smith, Ottumwa, IA (US); Stanley Jerome Johnson, Cedar Falls, IA (US); James W. Klimes, Moline, IL (US); Arlyn Ray Nelsen, Ottumwa, IA (US); Bradley W. Thorvilson, Fargo, ND (US); Marvin B. Wagner, Ottumwa, IA (US); Michael E. Delaney, Ottumwa, IA (US); Floyd Ernest Brown, Bloomfield, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/092,238

(22) Filed: Mar. 6, 2002

(65) Prior Publication Data

US 2003/0169176 A1 Sep. 11, 2003

(51) Int. Cl.[7] .............................................. G08B 21/00
(52) U.S. Cl. ........................ 340/684; 340/684; 340/457; 340/667; 340/672
(58) Field of Search ................................. 340/684, 457, 340/667, 672, 679, 540; 180/271, 272, 273, 53.1; 307/9.1

(56) References Cited

U.S. PATENT DOCUMENTS

| | | | |
|---|---|---|---|
| 4,843,767 A | 7/1989 | Johnson | 51/247 |
| 4,974,711 A | 12/1990 | Peterson, Jr. et al. | 192/12 D |
| 5,152,327 A | 10/1992 | Shoda | 144/1 A |
| 5,237,896 A | * 8/1993 | Albright et al. | 83/61 |
| 5,616,964 A | * 4/1997 | Peterson, Jr. | 180/53.1 |
| 6,316,891 B1 | * 11/2001 | Hough | 180/273 |

OTHER PUBLICATIONS

John Deere brochure, entitled: Forage Harvesting/Forage Harvesters, Choppers and Blowers Published Feb. 1995 Cover, front & back; pp. 14, 15, and 20–25.

* cited by examiner

Primary Examiner—Jeffery Hofsass
Assistant Examiner—Hung Nguyen

(57) ABSTRACT

A forage harvester represents agricultural implements that include at least one rotating component which is driven through a drive train including a main clutch operable between engaged and disengaged conditions so as to selectively couple and disconnect an output of the implement power source with the rotatable component. A rotation alarm circuit is provided for causing a warning device or devices to be energized in the event that the operator leaves a seat, in which he sits for normal operation, for a predetermined minimum time period while the rotatable component is still rotating, as determined by a rotation sensor. The warning device will remain energized until the rotatable component spins down to a zero speed.

7 Claims, 2 Drawing Sheets

AGRICULTURAL IMPLEMENT COMPONENT ROTATION ALARM

FIELD OF THE INVENTION

The present invention relates to agricultural implements, and more specifically relates to such implements as have rotational components located remotely from an operator's station associated either with the implement itself or with a vehicle towing the implement.

BACKGROUND OF THE INVENTION

The functional elements of agricultural crop harvesters include some that are relatively massive and driven in rotation. When the power for driving these components is disconnected by an action of the operator, the operator is apt to believe that the rotation of the component has stopped, when in fact, the inertia of the component causes it to continue to rotate. This rotation will sometimes continue for several minutes, which is beyond the time that it takes for an operator to leave the operator's station and remove shielding extending about, or open an access door of a housing containing, the component, thus exposing the operator to danger.

U.S. Pat. No. 4,843,767 discloses one example of a harvester having rotating components which are remotely controlled by an operator and which may possibly operate so as to give rise to the above-described problem.

U.S. Pat. No. 4,974,711 discloses a brake and clutch control system for the power take-off of a lawn and garden tractor that may be equipped with a mower coupled to the tractor power take-off. The control system may embody a seat switch that acts to cause the power take-off control clutch to be disengaged and the brake to be engaged in the event that the operator leaves the seat. While such a system ensures that the operator will not accidentally come into contact with the rotating mower blades, a practical system for reliably stopping the spin down of large inertia components is not yet available.

U.S. Pat. No. 5,132,327 discloses a control system for warning an operator of the continued rotation of a spindle for a machine, such as a wood working machine, due to the inertia of the spindle after a motor for rotating the spindle is shut off. In this control system, the location of the operator is not taken into account and the warning device is a light which is normally lit when the drive motor is operating so the operator may not pay attention to it after the power to the motor is discontinued.

SUMMARY OF THE INVENTION

According to the present invention, there is provided an improved warning system for use with agricultural implements embodying rotatably driven components, for example, forage harvesters, combines, cotton harvesters and the like.

An object of the invention is to provide a warning system, incorporated in the component drive control system, so as to reduce the likelihood of an operator coming into contact with a rotating component of the implement after the operator has disconnected the power to the component.

A more specific object of the invention is to provide an electrical safety interlock circuit which includes an operator presence sensor and a component rotation sensor having respective outputs coupled to a circuit for controlling operation of a warning device, the circuit operating to activate the warning device if the operator, after disengaging power to the rotating component, leaves the operator's seat while the component is still rotating.

Yet a more specific object of the invention is to provide a safety interlock circuit, as stated in the immediately preceding object, wherein a count-up timer device is provided which prevents actuation of the warning device in the event that the operator leaves the operator seat only momentarily.

Another specific object of the invention is to provide a safety interlock circuit, as stated in one or more of the preceding objects, wherein the circuit contains a timer circuit which times out to cause the warning device to be turned off only upon the expiration of a time sufficient for the rotating component to spin down.

A further object of the invention is to provide a safety interlock circuit, as stated in one or more of the preceding objects, wherein the warning device is kept from being activated when the circuit receives a signal indicative of the operator intentionally selecting a mode of powered operation before leaving the operator seat.

These and other objects of the invention will become apparent from a reading of the ensuing description together with the appended drawings.

DESCRIPTION OF THE PREFERRED EMBODIMENT

Figure 1:
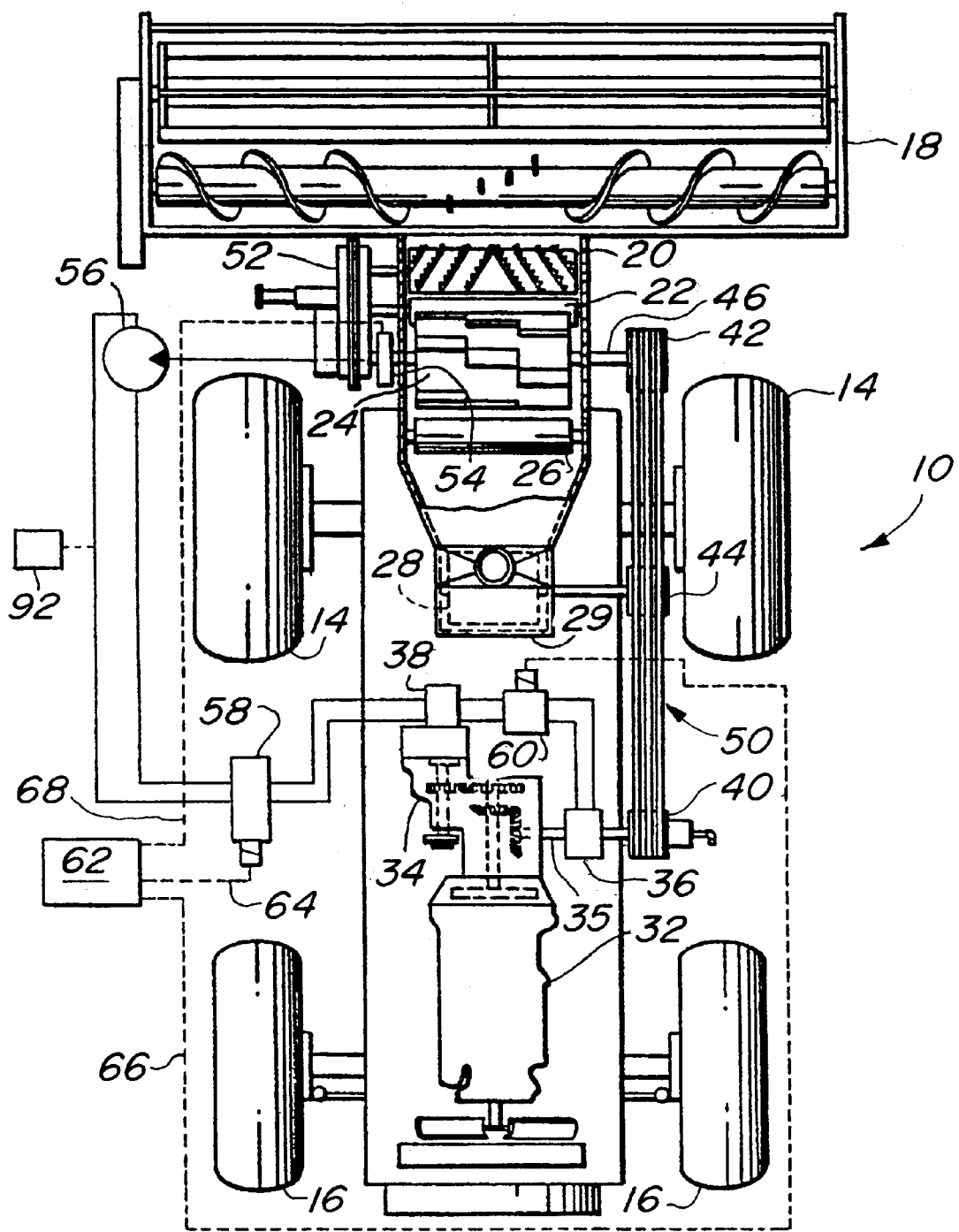
FIG. 1 is a schematic top view of a self-propelled agricultural harvester with which the present invention has utility.

Referring now to FIG. 1 there is shown a self-propelled forage harvester 10, which is representative of the environment in which the present invention is particularly useful, it to be understood that the invention would also be adaptable for use with other harvesters or implements such as combines, cotton pickers and balers, for example. The harvester 10 includes a main frame 12 supported for being driven over the ground on a pair of front drive wheels 14 and a pair of rear steerable wheels 16. Coupled to the front of the frame 12, so as to be in view of an operator seated in a cab (not shown) mounted to the front of the frame 12, is a crop gathering head 18 which delivers crop to the rear where it passes between upper and lower sets of counter-rotating feed rolls 20 and 22 which act to compress the crop into a mat and feed the mat across a stationary cutter bar (not shown). A cutterhead or chopper drum 24 is mounted in such relationship to the cutter bar that its knives sweep past the cutter bar and cut the mat of crop into short pieces. The cutterhead 24 delivers the cut crop tangentially to a bite of a pair of counter-rotating processing rolls 26, that in turn deliver the crop to a blower 28. The blower 28 is located in a housing 29 that converges to an outlet 30 to which is coupled a discharge duct (not shown), the blower 28 operating to propel the crop through the discharge duct, which directs the chopped crop to a container (not shown), such as a towed trailer, for example.

The drive wheels 14 and other driven components of the harvester receive their power from an engine 32 mounted on the rear of the frame 12. A power splitter transmission 34 is coupled to an output shaft at a front end of the engine 32 and contains a bevel gear set which delivers power to a transverse shaft 35 carrying an electronically controlled, hydraulically actuated main drive clutch 36, and to a longitudinal shaft coupled to a service hydraulic pump 38.

A main drive arrangement for the crop processing components of the forage harvester 10 includes a main drive pulley 40 coupled to an output side of the main drive clutch 36, and cutterhead and blower drive pulleys 42 and 44, respectively, coupled to cutterhead and blower drive shafts 46 and 48. A drive belt arrangement 50 is trained about the pulleys 40, 42 and 44.

Mounted at the left side of a housing containing the feed rolls 20 and 22, and the cutterhead 24 is a feed roll gear box or transmission 52 having respective output shafts coupled to the feed rolls 20 and 22 and an input shaft coupled to the cutterhead shaft 46 by way of a conventional electrically operated clutch 54. A one-way hydraulic reverser motor 56 is coupled to an input shaft of the gear box 52 for driving the cutterhead 24 in reverse for knife sharpening. The motor 56 is powered by hydraulic fluid pressure supplied from the pump 38 and communicated to the motor 56 by a solenoid operated valve 58. A solenoid-operated, main clutch control valve 60 controls fluid communication between the pump 38 and the main drive clutch 36.

A feed roll FNR switch 62 is connected to the valves 58 and 60 by respective leads 64 and 66, and to the clutch 54 by a lead 68, so that an operator can actuate the switch 62 to disengage the main clutch 36, engage the clutch 54 and cause the motor 56 to drive the cutterhead 24 in reverse as is required during knife sharpening. If the clutch 54 is disengaged, the feed rolls 20 and 22 will rotate in reverse so as to back out obstructions, for example.

Figure 2:
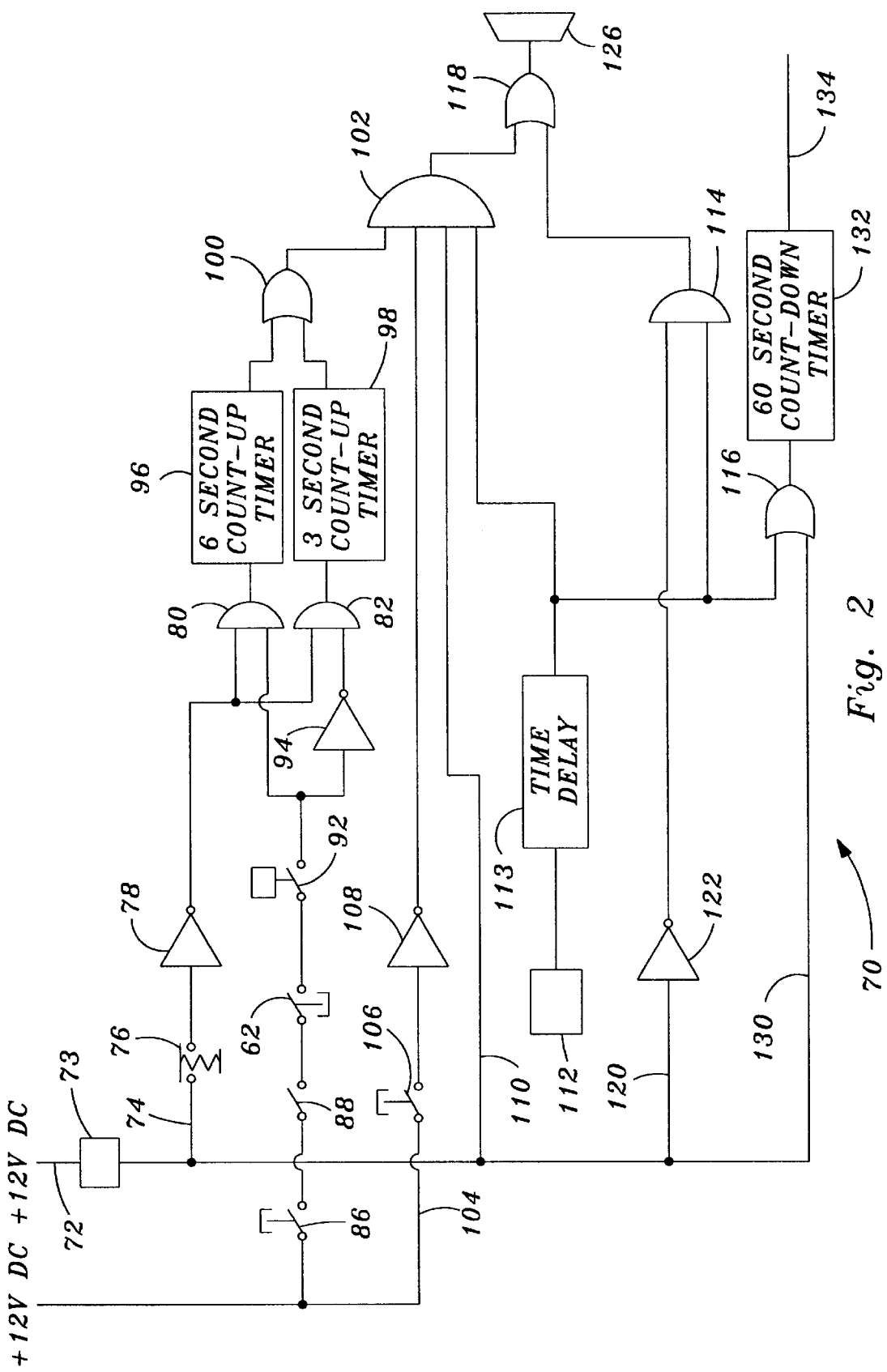
FIG. 2 is schematic diagram of the rotation alarm circuit adapted for use with the harvester illustrated in FIG. 1.

Referring now to FIG. 2, there is shown an electrical rotation alarm or warning circuit 70, here shown as a logic circuit, that is adapted for use with the forage harvester 10, with it to be understood that a circuit embodying the principles of the circuit 70 may just as easily be adapted to other agricultural harvesters or implements having rotating components that operate such as to need a warning circuit. The warning circuit 70 includes a 12 volt supply source coupled to a power lead 72 and to an ignition switch 73 coupled to a seat switch lead 74 containing a seat switch 76 that is biased to a normally open position, as shown, when an operator is absent from the operator's seat. The switch 73 is but one way of sensing the presence of the operator, with optical or other types of sensors being possible just so long as they produce a signal indicating the presence, or lack of same of the operator. The output of the seat switch 76 is coupled to an inverter 78 having its output parallel-connected to first input terminals of first and second AND gates 80 and 82, respectively.

Coupled to the power lead 72 is a lead 84 containing four switches connected in series, namely a main clutch control switch 86, a metal detector system ON/OFF switch 88, The feed roll FNR switch 62 and a reverse motor pressure switch 92. The contact of the pressure switch 92 has a parallel connection with a second input of the first AND gate 80 and with a second inverter 94, the latter having its output coupled to a second input of the second AND gate 82. Outputs of the first and second AND gates 80 and 82 are respectively coupled to inputs of first and second count-up timer circuits 96 and 98 having respective outputs coupled to first and second inputs of an OR gate 100 having its output, in turn, coupled to a first input of a third AND gate 102. While other time limits may be used, the practical example disclosed here uses a 6 second time period for the circuit 96 and a 3 second time period for the circuit 98.

Another lead 104 is connected to the power lead 72 and contains a power-saver switch 106 (closed during knife-grinding operation, for example) having its output terminal coupled to a third inverter 108, which in turn has its output terminal connected to a second input terminal of the AND gate 102.

A further lead 110 is connected to the output of the ignition switch 73 in parallel with the seat switch power lead 74, the lead 110 being connected to a third input of the third AND gate 102.

A cutterhead rotation sensor 112, is associated with the cutterhead drive shaft 46. As long as the critical driven components all derive their rotation in series with the cutterhead 24, as shown in FIG. 1, only one rotation sensor is required. Further, the rotation sensor 112 can be an electric, electromagnetic or optical movement sensor, with the only requirement being that the sensor output an electric signal. While rotation sensors having different characteristics may be used, in one practical example, the sensor 112 is a variable reluctance speed sensor having a lower speed sensing capability of about 300 rpm. Therefore, the sensor 112 is coupled to a time delay circuit 113 that processes the pulses received from the sensor such that it maintains a high output for so long as the rotation is above 300 rpm and for a programmed time duration thereafter, for a purpose explained more fully below. An output of the time delay circuit 113 is coupled to a fourth input terminal of the third AND gate 102, a first input of a fourth AND gate 114 and a first input of a third OR gate 116. The output of the AND gate 102 is coupled to a first input of a second OR gate 118.

Another lead 120 is connected between the ignition switch 73 and a fourth inverter 122 having its output connected to a second input of the fourth AND gate 114. The output of the AND gate 114 is connected to a second input of the second OR gate 118, the output of which is connected to an audible warning device, such as a horn 126 that is mounted in the vicinity of the cutterhead 24. Of course multiple warning devices could be used and distributed about the forage harvester 10 where desired. A lead 130 is also connected between the ignition switch 73 and a second input terminal of the third OR gate 116 having its output coupled to a count-down or power down timer circuit 132 having its output coupled to an electronics power lead 134, and being for the purpose of turning off the power to the control circuit after an elapse of time, 60 seconds, for example, after the harvester 10 is shut off and the horn has stopped sounding.

The operation of the control circuit 70 is as follows. Assume a condition of operation where the ignition switch 73 is ON, the operator is seated and the main clutch control switch 86 is ON, with the cutterhead 24 and blower 28 being driven in the forward direction. Under this condition, the seat switch 76, main clutch control switch 86, metal detector switch 88, FNR switch 62 and the reverse motor pressure switch 92 will all be closed. This results in the input to the first inverter 78 being high, with its output, and hence, the first inputs of the first and second AND gates 80 and 82 being low. The signal over the lead 84 will also be high, so the second input to the first AND gate 80 will be high, resulting in the output from the AND gate 80 being low. Accordingly, the count-up timer circuit 96 will be reset to zero and its output will be low.

The high signal on the lead 84 will also be connected to the input of the second inverter 94, with its low output being coupled to the second input of the second AND gate 82. With both inputs to the second AND gate 82 being low, its output will be low. Accordingly, the count-up timer circuit 98 will be reset to zero and its output will be low. With the outputs of both count-up timer circuits 96 and 98 being low and fed as inputs to the first OR gate 100, the output of the OR gate 100 will be low, as will be the first input to the third AND gate 102. The power saver switch 106 will be open so the signal at the input to the inverter 108 will be low with its output being high so that the second input of the AND gate 102 is high. The high output of the ignition switch 73 is connected directly to the third input of the third AND gate 102. The cutterhead rotation sensor 112 supplies pulses to the time delay circuit 113, which acts to provide a high signal to the final input of the third AND gate 102, as well as high inputs to each of the fourth AND gate 114 and the third OR gate 116. Because one of the inputs to the AND gate 102 is low, its output will be low, thus supplying a low signal to one of the inputs to the second OR gate 118. The signal coupled to the input of the fourth inverter 122 is high, resulting in its output being low and the input to the fourth AND gate 114 being low. The low output from the AND gate 114 is connected to the second terminal of the third OR gate 118. Thus, the output of the OR gate 118 is low and the horn 126 does not sound. Both inputs to the third OR gate 116 are high so the count-down timer circuit 132 is reset to the timeout value. Its output is high at this point, so the power to the control circuit 70 remains on.

Assume next a condition the same as the above, except that the operator has left the seat so that the seat switch 76 is open, and the main clutch control switch 84 is likewise open or OFF. The inverter 78 will cause first inputs of the AND gates 80 and 82 to be high, while the second input to the AND gate 80 will be low and the second input to the AND gate 82 will be high. Thus, the count-up timer circuit 96 will not be started, but the count-up timer circuit 98 will be started. Assuming that the operator remains out of the seat for at least 3 seconds, the output of the count-up timer circuit 98 will go high, resulting in one of the inputs to the OR gate 100 being low and the other high resulting in a high output, which is at the first input of the AND gate 102. The pressure switch 106 is open so the inverter 108 passes on a second high signal to the AND gate 102. The third lead 110 connects a third high signal to the AND gate 102 and the rotation sensor 112 acts to activate the time delay circuit 113 which passes on a high output signal to the fourth input to the AND gate 102. With all the inputs to the AND gate 102 being high, it passes a high signal to one input of the OR gate 118, and because of this, it sends on a high signal which causes the horn 126 to sound.

If the ignition switch 73 is turned off, no different result is obtained. Specifically, the input to the inverter 78 is still low and a low signal is coupled over the lead 110 to the input of the AND gate 102. Therefore, the input to the OR gate 118 will be low. The inverter 122 will now receive a low input and operate to place a high signal at the input to the input of the AND gate 114. So long as the cutterhead is still spinning, a high signal will pass from the time delay circuit 113 to the other input of the AND gate 114, resulting in a high signal being received by the OR gate 118 and output to the horn 126 to cause it to sound.

The time delay circuit 113 will continue to have a high output until the rotation speed of the cutterhead 24 falls below the accuracy limit of the sensor 112, in this case 300 rpm. At this point the time delay of the circuit 113 will be triggered and the output signal will continue to be high until the circuit 113 times out, at which time the output will go low, causing the horn 126 to be turned off.

With the ignition switch 73 open and the output of the time delay circuit 113 low, a low signal will be placed on an input of each of the third AND gate 102, fourth AND gate 114 and third OR gate 116. Because the input of the inverter 122 will be low, it again acts to place a high signal at the input to the AND gate 114. Since an input to the AND gate 114 is low, its output is low and is connected to one input of the OR gate 118. A low input will be connected to the count-down timer circuit 132 which will cause it to begin to count down. After the circuit times down to zero, its output will go low resulting in the power to the control circuit 70 being turned off so as to not run the battery down.

Assuming that it is desired to power the cutterhead 24 in reverse for sharpening its blades, the operator will deliberately actuate the FNR switch 62 so as to cause the main clutch 36 to be disengaged, the clutch 54 to be engaged and the motor 56 to operate to drive the cutterhead 24 in reverse. Further assume that the operator has left the seat. In this case, the seat switch 76 will be open resulting in a high signal appearing at the input to the AND gate 80. Also, the main clutch switch 86, the metal detector switch 88 and the FNR switch 62 will be open while the reverse motor pressure switch 92 will be closed. This results in a low signal being received by the other input of the AND gate 80 so that it sends a low signal to the count-up timer circuit 96 to cause it to reset to zero and send a low signal to one input of the OR gate 100. A high signal will be present at both inputs to the AND gate 82, resulting in the input to the count-up timer circuit 98 being high. After three seconds, the circuit 98 will send a high signal to the input of the OR gate 100 which will operate to place a high signal at one input to the AND gate 102. The power saver switch 106 will be closed and will pass on a high signal to the inverter 108 which acts to place a low signal at the input to the AND gate 102. No matter what the other inputs to the AND gate 102 are, its output is low resulting in the input to the OR gate 118 being low. The output of the inverter 122 and, hence, the input to the AND gate 114 is low. Accordingly, the output to the OR gate 118 is low. Since both inputs to the OR gate 118 are low, the horn 126 will not sound.

Thus, the logic elements of the circuit 70 act to warn the operator of continued rotation of a driven component after the operator has taken steps to disconnect power to the driven component, but prevent the warning device to be activated when the operator takes deliberate steps to connect power for driving the driven component.

Having described the preferred embodiment, it will become apparent that various modifications can be made without departing from the scope of the invention as defined in the accompanying claims.

What is claimed is:

1. An apparatus for providing an automated rotation warning alarm on an agricultural machine including a rotatable component, an operator's station located remote from the rotatable component, a source of power for driving the component, and a drive train coupled between the source of power and said rotatable component and including a main clutch selectively operable between engaged and disengaged conditions, the apparatus comprising: an operator presence sensor located for determining whether the operator is located at the operator station and producing a corresponding operator presence signal; a rotation sensor for determining whether or not said rotatable component is rotating and producing a corresponding rotation signal; a main clutch control sensor for determining whether said main clutch is engaged or disengaged and producing a corresponding main clutch condition signal; a warning device; and a control circuit connected for receiving said operator presence signal, said rotation signal, and said main clutch condition signal; said control circuit being connected to said warning device and operable for activating said warning device in the event said operator presence signal indicates that the operator is absent from said operator's station and said rotation sensor is producing a rotation signal.

2. The apparatus, as defined in claim 1, wherein said control circuit includes a time delay circuit coupled for receiving said operator presence signal and which becomes energized when said operator presence signal indicates that the operator is absent from the seat, with said time delay circuit acting to send a signal for energizing said warning device only after a preselected given time has elapsed, whereby a momentary absence of the operator from the seat will not result in the warning device becoming active.

3. The apparatus, as defined in claim 2, wherein said operator's station includes a seat; said operator presence sensor being a normally open switch which is closed when an operator is seated in said seat.

4. The apparatus, as defined in claim 1, wherein said control circuit contains a second time delay circuit coupled for receiving said rotation signal and operable for sending a signal for turning off said warning device once a minimum measurable speed has been detected and a predetermined period of time has elapsed which is at least equal to the time necessary for said rotatable component to spin down to zero speed from said predetermined minimum measurable speed.

5. The apparatus, as defined in claim 1, wherein said control circuit includes a power path which goes through an ignition switch; and said control circuit including logic components arranged such that said warning device will be energized both when said ignition switch is closed and when it is open, if said operator presence sensor is sending a signal representing an absence of said operator from said seat and said rotation sensor is sending said a signal indicating rotation of said rotatable component.

6. The apparatus, as defined in claim 4, wherein said control circuit further includes a power down circuit containing a power down time delay circuit operable in response to a signal for deactivating said warning device for causing the power to be cut off from the alarm circuit once said power down delay circuit has timed out.

7. The apparatus, as defined in claim 1, and further including a second source of power for driving said rotatable component in reverse; said second source of power including control devices for selectively causing reverse drive of said rotatable component after said main clutch is disengaged; a reverse drive sensing arrangement for determining when said control devices have been operated to cause reverse driving of said rotatable component and producing a reverse control signal to said control circuit; and said control circuit operating to prevent activation of said warning device even when said operator presence sensor sends a signal indicating that the operator has left said operator's station.

* * * * *